United States Patent
Hiller

(10) Patent No.: US 10,883,418 B2
(45) Date of Patent: Jan. 5, 2021

(54) TURBOCHARGER FOR AN INTERNAL COMBUSTION ENGINE

(71) Applicant: CPT GROUP GMBH, Hannover (DE)

(72) Inventor: Marc Hiller, Alzey (DE)

(73) Assignee: CPT Group GmbH, Hannover (DE)

( * ) Notice: Subject to any disclaimer, the term of this patent is extended or adjusted under 35 U.S.C. 154(b) by 0 days.

(21) Appl. No.: 16/332,189

(22) PCT Filed: Aug. 1, 2017

(86) PCT No.: PCT/EP2017/069409
§ 371 (c)(1),
(2) Date: Mar. 11, 2019

(87) PCT Pub. No.: WO2018/050347
PCT Pub. Date: Mar. 22, 2018

(65) Prior Publication Data
US 2019/0264603 A1    Aug. 29, 2019

(30) Foreign Application Priority Data
Sep. 14, 2016  (DE) .................. 10 2016 217 528

(51) Int. Cl.
| | |
|---|---|
| *F02B 37/22* | (2006.01) |
| *F02B 37/16* | (2006.01) |
| *F16K 31/122* | (2006.01) |
| *F16K 1/16* | (2006.01) |
| *F01D 17/10* | (2006.01) |

(Continued)

(52) U.S. Cl.
CPC .......... *F02B 37/225* (2013.01); *F01D 17/105* (2013.01); *F02B 37/16* (2013.01);
(Continued)

(58) Field of Classification Search
CPC ........ F02B 37/225; F01D 17/105; F02C 6/12; F02C 9/18; F04D 27/0253; F04D 29/4213;
(Continued)

(56) References Cited

U.S. PATENT DOCUMENTS

| | | | | |
|---|---|---|---|---|
| 2,431,398 A | * | 11/1947 | Hasbrouck .............. | F02B 33/00 415/157 |
| 3,232,043 A | * | 2/1966 | Birmann ................. | F02B 37/24 60/611 |

(Continued)

FOREIGN PATENT DOCUMENTS

| | | | | |
|---|---|---|---|---|
| DE | 2855666 A1 | * | 7/1980 | ................ F02C 6/12 |
| DE | 10049198 A1 | | 4/2002 | |

(Continued)

OTHER PUBLICATIONS

JP-61155623-A Komatsu, Hiroshi Pub Jul. 1986 (English Translation) (Year: 1986).*

*Primary Examiner* — Ngoc T Nguyen
(74) *Attorney, Agent, or Firm* — Laurence A. Greenberg; Werner H. Sterner; Ralph E. Locher

(57) ABSTRACT

A turbocharger for an internal combustion engine has a bearing housing, in which a rotor shaft is mounted in a rotatable manner. A compressor having a compressor wheel is arranged for conjoint rotation on the rotor shaft. A fresh air supply channel conducts a fresh air mass flow to the compressor wheel. The fresh air supply channel has a first flow cross section upstream of the compressor wheel. A flow control device is provided and is adjustable between an open position, in which the first flow cross section is opened up, and a closed position, in which the first flow cross section is reduced to a second flow cross section. The flow control device is fluidically coupled to a compressor channel of the compressor downstream of the compressor wheel, such that the flow control device is adjusted in a manner dependent on a pressure prevailing in the compressor channel.

11 Claims, 4 Drawing Sheets

(51) Int. Cl.
*F04D 27/02* (2006.01)
*F04D 29/42* (2006.01)

(52) U.S. Cl.
CPC ..... *F04D 27/0253* (2013.01); *F04D 29/4213* (2013.01); *F16K 1/165* (2013.01); *F16K 31/1223* (2013.01); *Y02T 10/12* (2013.01)

(58) Field of Classification Search
CPC ............. F05D 2220/40; F05D 2270/10; F05D 2270/101; Y02T 10/144; F16K 31/383; F16K 31/38; F16K 31/363; F16K 31/1223; F16K 31/1226; F16K 1/165; F16K 1/223
See application file for complete search history.

(56) References Cited

U.S. PATENT DOCUMENTS 6,474,318 B1    11/2002   Jones et al.
6,634,174 B2    10/2003   Sumser et al.
9,181,961 B1    11/2015   Lucas et al.
2011/0194904 A1 *  8/2011  Carlson ................... F04B 49/22
                                                              406/12

FOREIGN PATENT DOCUMENTS

| DE | 102008028298 A1 * | 12/2009 | ......... F04D 27/0246 |
| DE | 102012013047 A1 | 1/2013 | |
| DE | 102013003418 A1 | 8/2014 | |
| DE | 102014223044 A1 * | 5/2016 | ........... F01D 17/105 |
| DE | 102014223044 A1 | 5/2016 | |
| EP | 1947299 B1 | 5/2013 | |
| GB | 2470050 A | 11/2010 | |
| JP | S614826 A | 1/1986 | |
| JP | 61155623 A * | 7/1986 | ............ F02B 37/225 |
| JP | S61155623 A | 7/1986 | |
| JP | 11082036 A * | 3/1999 | ......... F02D 41/0007 |

* cited by examiner

TURBOCHARGER FOR AN INTERNAL COMBUSTION ENGINE

BACKGROUND OF THE INVENTION

Field of the Invention

The invention relates to a turbocharger for a combustion machine.

Exhaust-gas turbochargers are increasingly being used to increase power in motor vehicle internal combustion engines. More and more frequently, this is done with the aim of reducing the overall size and weight of the internal combustion engine for the same power or even increased power and, at the same time, of reducing consumption and thus CO2 emissions, with regard to ever stricter legal requirements in this respect. The principle of action consists in using the energy contained in the exhaust-gas flow to increase a pressure in an intake tract of the internal combustion engine and thus to bring about better filling of a combustion chamber of the internal combustion engine with atmospheric oxygen. In this way, more fuel, such as gasoline or diesel, can be converted in each combustion process, i.e. the power of the internal combustion engine can be increased.

To this end, the exhaust-gas turbocharger has an exhaust-gas turbine arranged in the exhaust tract of the internal combustion engine, a fresh-air compressor arranged in the intake tract and a rotor bearing arranged therebetween. The exhaust-gas turbine has a turbine housing and a turbine rotor arranged therein, which is driven by the exhaust-gas mass flow. The fresh-air compressor has a compressor housing and a compressor rotor arranged therein, which builds up a boost pressure. The turbine rotor and the compressor rotor are arranged for conjoint rotation on the opposite ends of a common shaft, referred to as the rotor shaft, and thus form what is referred to as the turbocharger rotor. The rotor shaft extends axially between the turbine rotor and compressor rotor through the rotor bearing arranged between the exhaust-gas turbine and fresh-air compressor, and is rotatably mounted in said rotor bearing in the radial and axial directions in relation to the rotor shaft axis. According to this construction, the turbine rotor driven by the exhaust-gas mass flow drives the compressor rotor via the rotor shaft, thereby increasing the pressure in the intake tract of the internal combustion engine in relation to the fresh-air mass flow behind the fresh-air compressor, and thereby ensures better filling of the combustion chamber with atmospheric oxygen.

The compressor is characterized in terms of its operating behavior by a so-called compressor characteristic map, which describes the pressure build-up versus the mass throughput for different compressor rotational speeds or circumferential speeds. A stable and usable characteristic map of the compressor is limited in the direction of low mass throughputs by the so-called surge limit, in the direction of relatively high mass throughputs by the so-called choke limit, and in terms of structural mechanics by the maximum rotational speed limit. In adapting an exhaust-gas turbocharger to an internal combustion engine, a compressor is selected which has a compressor characteristic map which is as expedient as possible for the internal combustion engine.

SUMMARY OF THE INVENTION

One object underlying the invention is to specify a compressor concept for a turbocharger which contributes to efficient operation of the turbocharger.

A turbocharger for a combustion machine is disclosed. The turbocharger has a bearing housing, in which a rotor shaft is mounted in a rotatable manner. Also provided is a compressor having a compressor wheel, which is arranged for conjoint rotation on the rotor shaft. The turbocharger has a fresh air supply channel for conducting a fresh air mass flow to the compressor wheel, wherein the fresh air supply channel has a first flow cross section upstream of the compressor wheel. The turbocharger has a flow control device which is adjustable between an open position, in which the first flow cross section is opened up, and a closed position, in which the first flow cross section is reduced to a second flow cross section. The flow control device is fluidically coupled to a compressor channel of the compressor downstream of the compressor wheel, such that the flow control device is adjusted in a manner dependent on a pressure prevailing in the compressor channel.

It is typically the case in exhaust-gas turbochargers that an inlet cross section (flow cross section) in the compressor for the fresh-air mass flow in front of the compressor wheel is constant. This would, in combination with the compressor wheel, necessitate a predetermined compressor characteristic map, whereby the exhaust-gas turbocharger would be restricted for example in terms of a so-called thermodynamic range.

By means of the flow control device, which is arranged in the inlet region of the fresh-air mass flow into the compressor, the inlet cross section in front of the compressor wheel can be adjusted variably, for example in continuous fashion, between the closed position and the open position (including the closed position and open position). In this way, a type of throttle function for the fresh-air mass flow is realized, whereby, in an at least partial closed position, the compressor characteristic map and the surge limit are shifted to the left. In the open state, total pressure losses in the inlet region of the compressor are minimized, such that the compressor characteristic map is not influenced, or is scarcely influenced, by the flow control device. "Substantially opened up" means that approximately the entire first flow cross section is utilized for the impingement of flow on the compressor wheel.

In particular, the flow control device is a self-controlling mechanism which is adapted to the compressor pressure. The compressor pressure corresponds to the boost pressure generated by the compressor owing to the compression of the fresh-air mass flow. In other words, the flow control device reacts in self-controlling fashion to the compressor pressure. The adjustment of the flow cross section in front of the compressor wheel is realized by means of the fluidic connection to the compressor channel. The flow cross section is self-controlling or automatically controlled in a manner dependent on the pressure generated. It is not necessary to provide, for example, additional actuators that actively control the flow cross section.

Here and below, "upstream" means a region in front of the compressor wheel, that is to say before the impingement of the fresh-air mass flow on the compressor wheel, and before said fresh-air mass flow is compressed. In front of the compressor, the fresh-air mass flow flows substantially at normal pressure. Here and below, "downstream" means a region behind the compressor wheel, that is to say after the passage of flow through the compressor wheel or after the compression of the fresh-air mass flow. Behind the compressor, the fresh-air mass flow is, during operation, present at elevated pressure, a corresponding boost pressure. The terms "in front of" and "behind or after" provide information regarding the fresh-air mass flow in relation to the compressor wheel.

Here and below, the compressor channel means a channel behind the compressor wheel. In other words, this is a channel in which the fresh-air mass flow flows after being compressed. The compressor channel may also be referred to as a ring-shaped channel, spiral or spiral channel.

The first and the second flow cross section may also be referred to as inlet cross section for the compressor wheel for the impingement of flow thereon. The flow control device is designed such that a corresponding flow cross section directly in front of the compressor wheel with respect to a rotor axis of rotation is adjusted.

The first flow cross section is that cross section which is present in an inlet region of the compressor. In other words, this is the maximum cross section of the fresh-air supply channel which is available for the impingement of flow on the compressor. The fresh air supply channel is part of the compressor housing, though may alternatively also be part of an intake connector or the like.

In one embodiment, the flow control device has a control cylinder which, for the purposes of adjusting the flow control device, is mounted so as to be displaceable axially with respect to a rotor axis of rotation of the rotor shaft, and which is fluidically coupled to the compressor channel of the compressor downstream of the compressor wheel. In this way, the flow cross section can be adjusted by displacement of the control cylinder, wherein the control cylinder is controlled automatically in accordance with the compressor pressure prevailing behind the compressor. The control cylinder is for example a ring-shaped design and arranged around the rotor axis of rotation. For example, the higher a compressor pressure in the compressor channel behind the compressor wheel is, the more the control cylinder is moved away from the compressor wheel with respect to the axial direction. For example, flow guide elements are arranged on the control cylinder, which flow guide elements correspondingly vary the flow cross section as the control cylinder is displaced.

In one embodiment, the control cylinder is displaceable between two axial end positions, wherein one axial end position corresponds to the open position of the flow control device and the other axial end position corresponds to the closed position of the flow control device. For example, corresponding stops or stop elements are provided, which limit the axial movement. For example, the compressor housing has one or more stops.

In one embodiment, the control cylinder has an encircling piston ring, which is guided in axially displaceable fashion in a piston cavity which corresponds to the piston ring, wherein the piston cavity is formed in a compressor housing. The piston ring is to be understood as an encircling portion or projection, which protrudes in an axial direction, of the control cylinder, which portion or projection is guided in positively locking and axially displaceable fashion in the piston cavity. The piston cavity is an axially extending cavity which is formed in the compressor housing and which, with regard to a shaping in a radial direction with respect to the rotor axis of rotation, is adapted to a shaping of the piston ring. The cavity runs around the rotor axis of rotation.

In one embodiment, one or more seal elements are provided which are configured for sealing off the piston ring with respect to the piston cavity. For example, one or more seal elements, for example O-rings, are arranged in the cavity.

In one embodiment, the piston cavity is connected by means of one or more channels to the ring-shaped channel of the compressor. By means of the fluidic connection, the piston cavity is connected to the compressor channel such that a pressure prevailing in the compressor channel can act on the piston ring.

In other words, a pressure force of the pressure prevailing in the compressor channel is transmissible to the control cylinder or to the piston ring. The channel is for example a bore in the compressor housing. During the operation of the compressor, an elevated pressure is generated, which gives rise to an axial force on the piston ring. The adjustability of the flow control device can be influenced in a manner dependent on the configuration of an effective surface (cross-sectional area), which is acted on by the compressor pressure, of the piston ring.

The channel or the channels may be formed variably in terms of their number, position and orientation, for example with respect to the rotor axis of rotation. For example, the position and/or angle of a channel may be selected such that the opening of the bore in the compressor channel utilizes a dynamic pressure, or counteracts said dynamic pressure, owing to a flow direction of the fluid, for example of the fresh-air mass flow. The dynamic pressure defines, together with a static pressure, the so-called total pressure. In this way, a response point for the flow control device can be displaced within the compressor characteristic map in accordance with a desired configuration of the turbocharger. For example, an earlier or later response of the flow control device can be effected even if the static pressure on its own were not yet sufficient or were already too high. An exemplary position of a channel would be close to the tongue on a small pitch circle diameter or far away radially and tangentially.

In one embodiment, the flow control device has an axial spring element which is arranged so as to exert a spring force on the control cylinder in an axial direction with respect to the rotor axis of rotation counter to a pressure force exerted on the control cylinder by the pressure prevailing in the compressor channel, such that the control cylinder is axially displaceable, for example toward or away from the compressor wheel, in a manner dependent on the spring force and the pressure force. The axial spring element may act directly or indirectly via a further element on the control cylinder. The spring force acts counter to a pressure, acting on the piston ring, from the ring-shaped channel. The spring element is for example mounted axially on the control cylinder and on the compressor housing. The spring element contributes to the self-control capability of the flow cross section for the compressor. The adjustability of the flow control device can be influenced in a manner dependent on the configuration of the spring element with regard to a spring force to be imparted or with regard to a spring rate.

In one embodiment, the flow control device has multiple guide vanes which are mounted rotatably on the control cylinder, wherein the guide vanes are adjustable between the open position and the closed position by displacement of the control cylinder. The guide vanes define the flow cross section in accordance with the self-control. Owing to the mechanical coupling of the guide vanes to the control cylinder, the guide vanes are adjusted in a manner dependent on an axial position of the control cylinder. For example, the guide vanes are fixed by means of a bearing bracket in or on the control cylinder, for example so as to be distributed over the inner circumference of the control cylinder.

In one embodiment, the guide vanes, in the open position, are arranged such that the guide vanes open up the first flow cross section, and wherein, with axial displacement of the control cylinder, the guide vanes are displaced in the direction of the compressor wheel and interact with the compressor housing such that the guide vanes are rotated in order to reduce the first flow cross section. This contributes to the self-control. For example, the guide vanes are supported with an outer side on the compressor housing, for example on a housing edge thereof, and slide on the latter in the direction of the rotor axis during displacement of the control cylinder. The outer side of the guide vanes is for example at least partially, for example in a region facing toward the compressor wheel with respect to the axial direction, adapted to the compressor housing with regard to a shaping.

In one embodiment, in the closed position, the guide vanes are displaced axially in a direction of the compressor wheel and are rotated such that the guide vanes form a substantially closed conical ring with the second flow cross section. The guide vanes are rotated relative to the rotor axis of rotation such that at least front ends of the guide vanes project into the flow channel. Here, the flow cross section narrows conically or in cone-shaped fashion by means of the guide vanes in the closed position. Thus, the compressor inlet area for the fresh-air mass flow is constricted, and a compressor characteristic map is correspondingly shifted.

In one embodiment, the guide vanes are shaped so as to have a tapering front end which faces toward the compressor wheel. In this way, the cone-shaped ring in the closed position is realized.

The guide vanes may vary in terms of number, shape and size, and may furthermore influence the flow control device.

In one embodiment, the flow control device has a radial spring element which is arranged so as to impart a spring force to in each case a rear end of the guide vanes in the direction of the rotor axis of rotation, such that a front end of the guide vanes is pressed against the compressor housing. An axis of rotation of the guide vanes is situated with respect to the rotor axis of rotation between a front end facing toward the compressor wheel and the rear end of the guide vanes, wherein the radial spring element acts on the rear end of the guide vane. In this way, the guide vanes are pressed by way of their outer sides against the compressor housing in the radial direction. The radial spring element ensures that the guide vanes, during the axial movement, can perform the rotational movement and bear against the compressor housing, for example a wall thereof, and moved into or out of the flow in a manner dependent on the axial displacement. In the corresponding axial end position of the control cylinder, the guide vanes have been pulled entirely out of the flow, for example a correspondingly high charge pressure has been attained by means of the compressor. Said guide vanes do not adversely disrupt and influence the compressor at relatively high rotational speeds and levels of power.

In one embodiment, the compressor housing is in two parts, wherein a first part of the compressor housing is fastened to the bearing housing and surrounds the compressor wheel, and wherein a second part of the compressor housing is fastened to the first part, and wherein the flow control device is arranged between the first and second parts. An installation process is thus made easier.

In one embodiment, the flow control device has the above-described elements such as control cylinder with piston ring, axial spring element, radial spring element and guide vanes. The self-controlling mechanism is realized in this way. The elements are designed and adapted to one another such that the following states are attained. In an installed state or in a non-operated state of the turbocharger, the axial spring element pushes the control cylinder in the direction of the compressor wheel, such that the guide vanes are in the closed position and constrict the flow cross section. In an operational state with corresponding boost pressure, the latter exerts a force on the piston ring such that the control cylinder is moved away from the compressor wheel and the guide vanes are thus likewise axially displaced. The radial spring element ensures that, here, the guide vanes perform a rotational movement out of the flow.

Further advantages and functions are disclosed in the following detailed description of an exemplary embodiment.

The exemplary embodiment is described in the following text with the aid of the appended figures. Identical elements or elements of identical action are denoted by the same reference designations throughout the figures.

DESCRIPTION OF THE INVENTION

Figure 1:
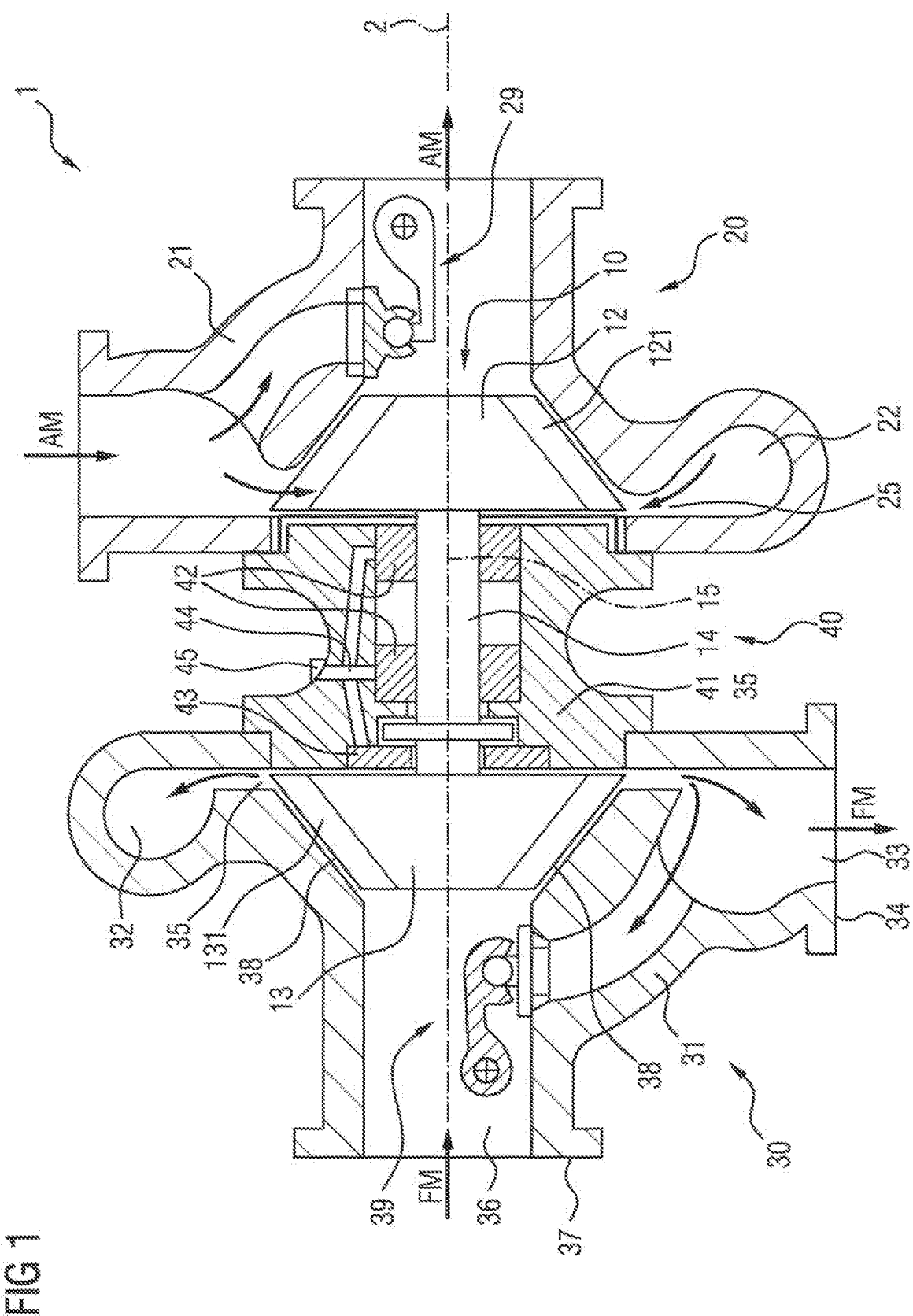
FIG. 1 shows a schematic sectional view of a turbocharger.

FIG. 1 schematically shows a sectional illustration of an example of an exhaust-gas turbocharger 1, which has an exhaust-gas turbine 20, a fresh-air compressor 30 and a rotor bearing 40. The exhaust-gas turbine 20 is equipped with a wastegate valve 29 and an exhaust-gas mass flow AM is indicated by arrows. The fresh-air compressor 30 has an overrun air recirculation valve 39 and a fresh-air mass flow FM is likewise indicated by arrows. A turbocharger rotor 10, as it is known, of the exhaust-gas turbocharger 1 has a turbine impeller 12 (also referred to as turbine wheel), a compressor impeller 13 (also referred to as compressor wheel) and a rotor shaft 14 (also referred to as shaft). The turbocharger rotor 10 rotates about a rotor axis of rotation 15 of the rotor shaft 14 during operation. The rotor axis of rotation 15 and at the same time the turbocharger axis 2 (also referred to as longitudinal axis) are illustrated by the indicated centerline and identify the axial orientation of the exhaust-gas turbocharger 1. The turbocharger rotor 10 is supported with its rotor shaft 14 by means of two radial bearings 42 and one axial bearing disk 43. Both the radial bearings 42 and the axial bearing disk 43 are supplied with lubricant via oil supply channels 44 of an oil connection 45.

In general, a conventional exhaust-gas turbocharger 1, as illustrated in FIG. 1, has a multi-part construction. Here, a turbine housing 21 in the exhaust tract of the internal combustion engine, a compressor housing 31 that is arrangeable in the intake tract of the internal combustion engine, and, between the turbine housing 21 and compressor housing 31, a bearing housing 41, are arranged adjacent to one another with respect to the common turbocharger axis 2 and connected together in terms of assembly.

A further structural unit of the exhaust-gas turbocharger 1 is represented by the turbocharger rotor 10, which has the rotor shaft 14, the turbine rotor 12, which is arranged in the turbine housing 21 and which has an impeller blade arrangement 121, and the compressor impeller 13, which is arranged in the compressor housing 31 and which has an impeller blade arrangement 131. The turbine impeller 12 and the compressor impeller 13 are arranged on the opposite ends of the common rotor shaft 14 and connected for conjoint rotation thereto. The rotor shaft 14 extends in the direction of the turbocharger axis 2 axially through the bearing housing 41 and is mounted axially and radially therein so as to be rotatable about its longitudinal axis, the rotor axis of rotation 15, wherein the rotor axis of rotation 15 coincides with the turbocharger axis 2.

The compressor housing 31 has a fresh-air supply channel 36, which has an intake pipe connector piece 37 for connection to the fresh-air intake system (not illustrated) of the internal combustion engine and which runs in the direction of the turbocharger axis 2 toward the axial end of the compressor wheel 13. Via this fresh-air supply channel 36, the fresh-air mass flow FM is drawn in from the fresh-air intake system by the compressor impeller 13.

Furthermore, the compressor housing 31 generally has a ring-shaped channel which is arranged in ring-shaped fashion around the turbocharger axis 2 and the compressor impeller 13 and which widens in spiral fashion away from the compressor impeller 13, and which is referred to as a so-called fresh-air volute 32 or compressor channel. Said fresh-air volute 32 has a gap opening which runs at least over a part of the inner circumference and which has a defined gap width, the so-called diffuser 35, which, directed in a radial direction away from the outer circumference of the compressor wheel 13, runs into the fresh-air volute 32 and through which the fresh-air mass flow FM flows away from the compressor impeller 13 at elevated pressure into the fresh-air volute 32.

The fresh-air volute 32 furthermore has a tangentially out-wardly directed fresh-air discharge channel 33 with a manifold connector piece 34 for connection to a fresh-air manifold (not illustrated) of an internal combustion engine. Through the fresh-air discharge channel 33, the fresh-air mass flow FM is conducted at elevated pressure, the compressor or boost pressure, into the fresh-air manifold of the internal combustion engine.

Over a particular region, between fresh-air supply channel 33 and diffuser 35, the radial inner contour of the compressor housing 31 follows the outer contour of the compressor impeller 13 accommodated therein. This region of the inner contour of the compressor housing 31 is referred to as compressor sealing contour 38 and has the effect that the fresh-air mass flow FM flows as completely as possible through the impeller blade arrangement 131 of the compressor impeller 13, and not past said impeller blade arrangement. In this respect, it is necessary for as small a gap as possible to be ensured between the compressor sealing contour 38 of the compressor housing 31 and outer contour of the compressor impeller 13 during operation, which gap duly permits a free rotation of the compressor impeller 13 but restricts the bypass flow losses to a minimum.

Further details of the turbocharger 1 will not be discussed any more specifically.

A turbocharger 1 according to an exemplary embodiment of the invention will be discussed below. Said turbocharger has, by contrast to FIG. 1, been modified at the compressor side and supplemented by a flow control device 50.

Figure 2:
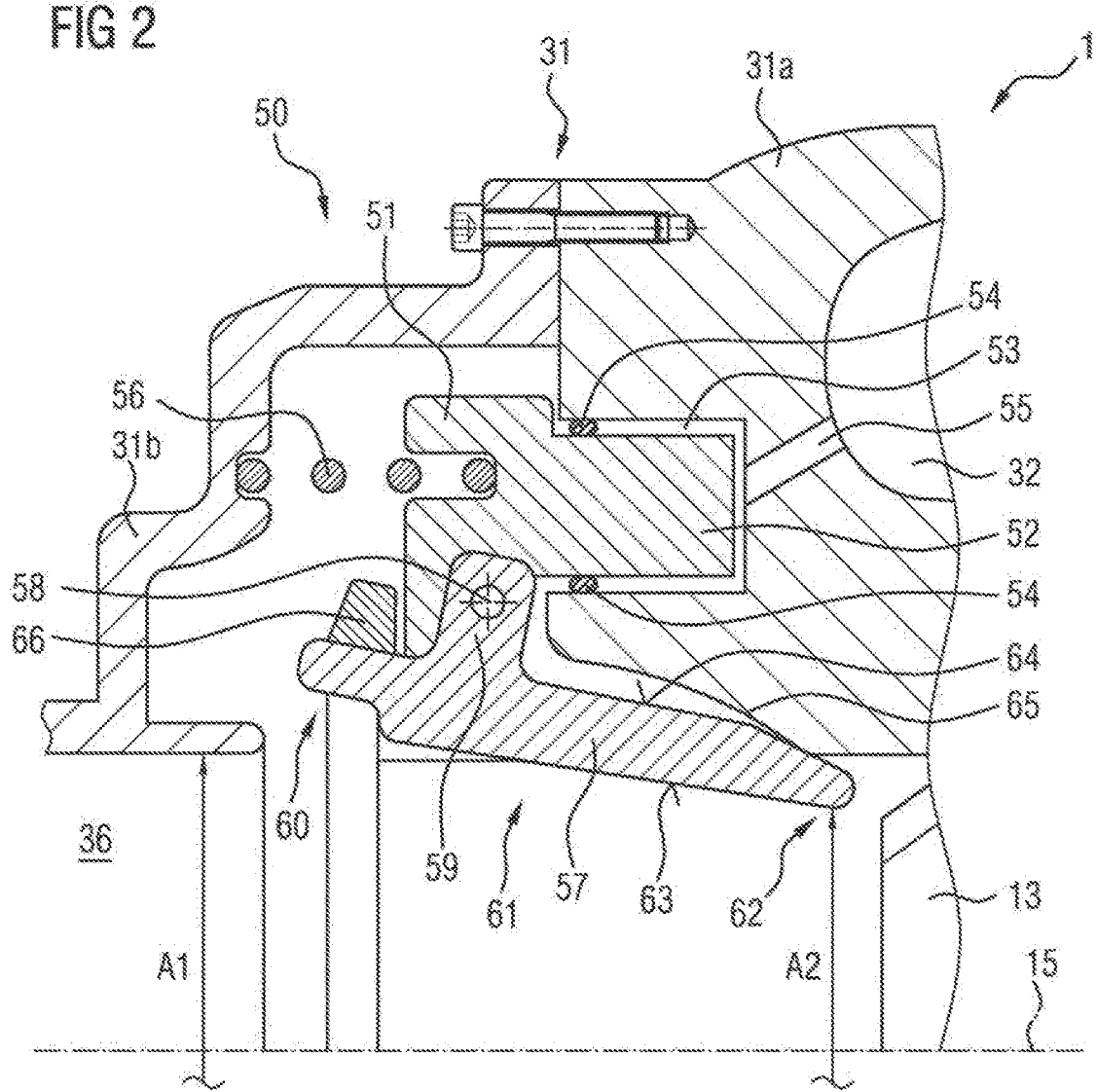
FIG. 2 shows a schematic partially sectional view of a turbocharger with a flow control device in a closed position as per an exemplary embodiment of the invention.
Figure 4:
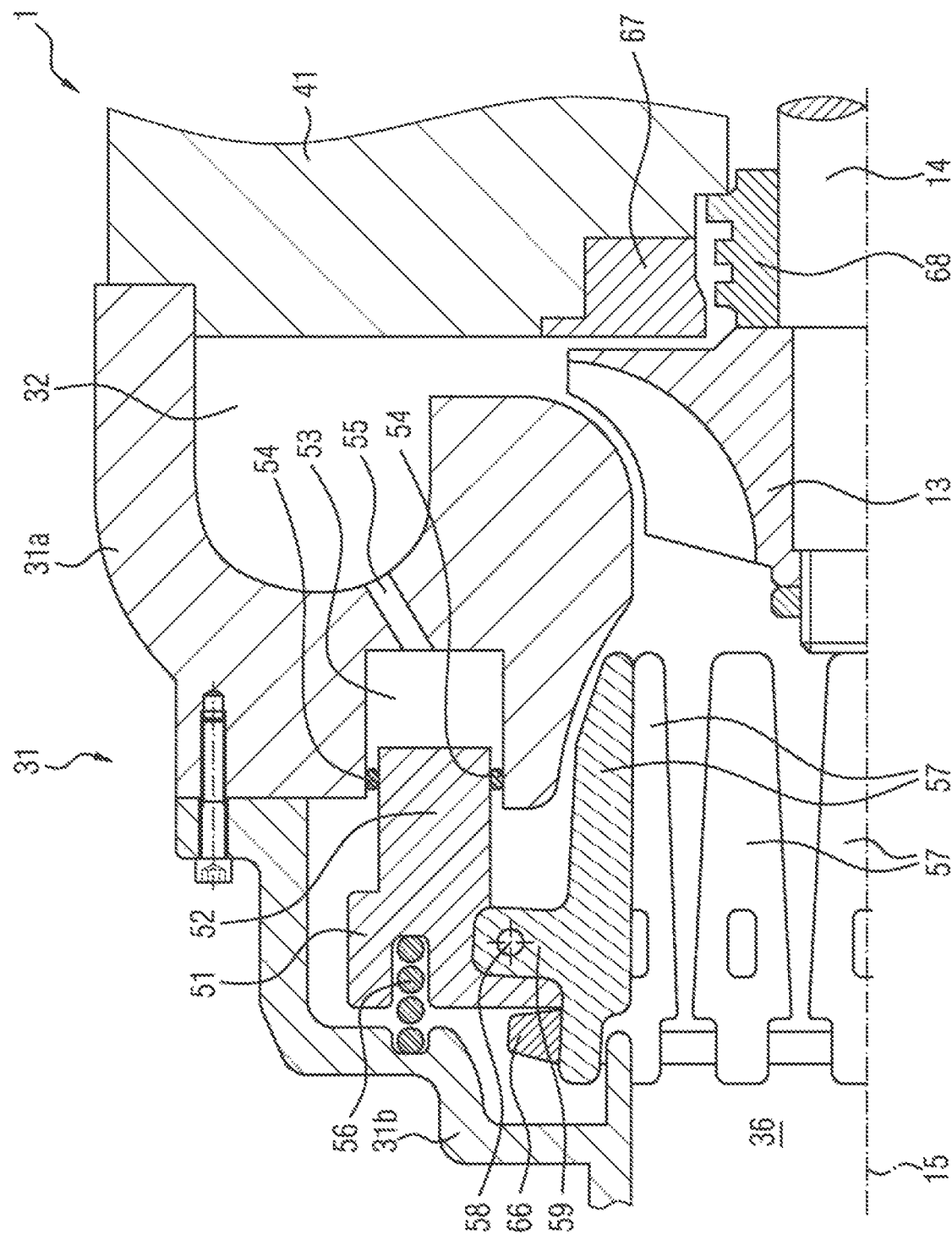
FIG. 4 shows a schematic partially sectional view of the turbocharger with the flow control device in an open position.

FIGS. 2 and 4 show schematic partially sectional views of the turbocharger 1 in two different operating states of the flow control device 50. The flow control device 50 serves for the variable adjustability of a flow cross section for the fresh-air mass flow FM in front of the compressor wheel 13, in order to improve a compressor characteristic map. The flow control device 50 will be discussed in detail below.

The compressor housing 31 is in two parts, and comprises a first part 31a, which is mounted on the bearing housing 41. The second part 31b is mounted on, for example screwed onto, the first part 31a. Between the two parts 31a and 31b of the compressor housing 31, the flow control device 50 is installed in the inlet region of the compressor 30.

The flow control device 50 has a control cylinder 51, which is of ring-shaped design and arranged around the rotor axis of rotation 15. The control cylinder 51 has a piston ring 52, which is of encircling design. By means of the piston ring 52, the control cylinder 51 is guided, so as to be displaceable axially with respect to the rotor axis of rotation 15, in a piston cavity 53. The piston cavity 53 is formed in the first part 31a of the compressor housing 31 as a ring-shaped encircling recess. In the piston cavity 53, there are arranged sealing elements 54 which seal off the piston ring 52 with respect to the piston cavity 53.

The piston cavity 53 is fluidically connected via at least one channel, in the exemplary embodiment a bore 55, to the fresh-air volute 32.

The flow control device 50 furthermore has an axial spring element 56. The axial spring element 56 is supported in the second part 31b of the compressor housing 31 and interacts with the control cylinder 51. The axial spring element 56 exerts an axial spring force directly on the control cylinder 51 in the direction of the compressor wheel 13 (indicated in FIG. 2).

Furthermore, multiple guide vanes 57 are mounted, rotatably with respect to axes of rotation 58, on the control cylinder 51. Whereas FIG. 2 shows only one guide vane 57 in section, multiple guide vanes 57 are indicated in FIG. 4. The guide vanes 57 are rotatably mounted on the control cylinder 51 via in each case one bearing bracket 59. The axes of rotation 58 run perpendicular to the rotor axis of rotation 15. For the installation of the guide vanes 57, the control cylinder 51 may be formed as one piece and slotted, for example crenellated, or else formed in two pieces.

Figure 3:
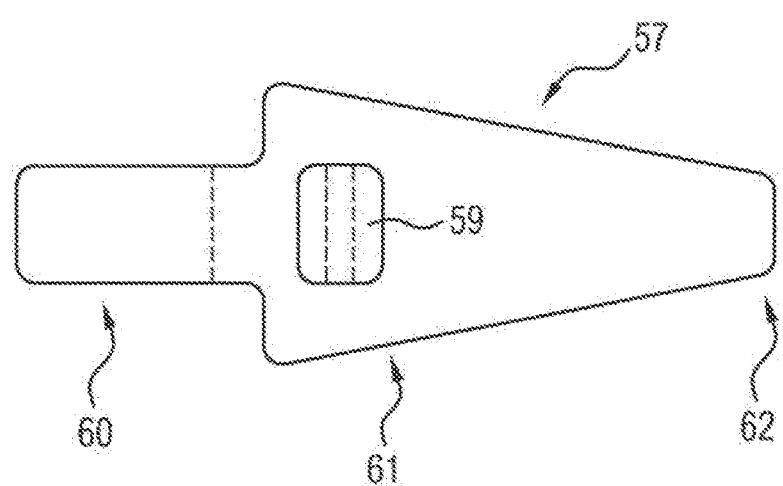
FIG. 3 shows a schematic plan view of a guide vane of the flow control device.

As shown in FIG. 3 in a plan view, the guide vanes 57 are of wedge-shaped form. With respect to the rotor axis of rotation 15, the guide vanes 57 have a rear end 60, a central portion 61 with the bearing bracket and the axis of rotation 58, and a front end 62 which tapers. An inner surface 63, facing toward the rotor axis of rotation 15 in the installed state, of the guide vanes 57 is substantially planar. In other words, the guide vanes 57 taper with respect to the axial direction, and have oblique flanks. An outer surface 64, which is averted from the rotor axis of rotation 15 in the installed state, is adapted with regard to a shaping, at least in the region of the front end 62, to a facing housing wall 65 of the first part 31a of the compressor housing 31.

Furthermore, a radial spring element 66 in the form of a spring ring is provided, which is arranged around the rear ends 60 of the guide vanes 57 and which exerts a spring force on the guide vanes 57 with respect to the rotor axis of rotation 15. In this way, the guide vanes 57 are rotated counterclockwise, such that the front ends 62 are pressed against the housing wall 65.

Alternatively, it is also possible for multiple axial and radial spring elements to be provided.

FIG. 2 shows a state of the flow control device 50 which may also be referred to as installation state or as non-operation state of the turbocharger 1. In this state, a first pressure p1, for example normal pressure, or no elevated compressor pressure, prevails in the fresh-air volute 32. In this state, the spring force of the axial spring element 56 is so great that the control cylinder 51 is displaced in the direction of the compressor wheel 13 into the piston cavity 53 as far as into a first axial end position. The axial spring element 56 may also transmit a spring force indirectly to the control cylinder 51, for example by interaction with the guide vanes 57 and/or with the radial spring element 66. In this way, owing to their direct mechanical coupling to the control cylinder 51, the guide vanes 57 are axially displaced and moved into the position shown. Here, the guide vanes 57 are supported on the housing wall 65, such that said guide vanes are, correspondingly to the arcuate shaping on the outer surface 64 in the region of the front ends 62, rotated inward about the axes of rotation 58. The rear ends 60 of the guide vanes are rotated radially outward counter to a spring force of the radial spring element 66. The spring element 66 is preloaded or is preloaded further. This spring force ensures that the guide vanes 57 are held with the front end 62 against the housing wall 65.

In the state shown in FIG. 2, the front ends 62, for example tips of the guide vanes 57, are moved close to the compressor wheel 13 or to the compressor wheel inlet. In this state, a maximum position, the guide vanes 57 form a substantially closed, cone-shaped ring. In this state, which is also referred to as closed position, the guide vanes constrict the first flow cross section A1 of the fresh-air supply channel 36 to a second flow cross section A2.

FIG. 4 shows an operating state of the turbocharger 1, wherein the fresh-air mass flow FM is present in the fresh-air volute 32 with a second pressure p2 which is elevated in relation to the first pressure p1. Owing to the bore 55 between the fresh-air volute 32 and piston cavity 53 and thus the control cylinder 51, the second pressure p2 reacts via the fresh-air volute 32 on the control cylinder 51, such that said control cylinder is, in a manner dependent on the second pressure p2, displaced axially in a direction away from the compressor wheel 13 counter to the spring force of the axial spring element 56. In this way, the guide vanes 57 are pulled away from the compressor wheel 13 in continuous fashion. Owing to the spring force of the radial spring element 66 on the rear ends 60 of the guide vanes 57, the guide vanes 57 rotate counterclockwise and bear closely against the housing wall 56. As a result, the guide vanes 57 move out of the flow of the fresh-air mass flow FM.

FIG. 4 shows a second axial end position of the control cylinder 51, wherein said control cylinder is in a position at a maximum distance from the compressor wheel 13. In this way, the guide vanes 57 are likewise in their end position, and have been pulled radially completely out of the flow. As a result, the first flow cross section A1 has been fully opened up. This is referred to as open position of the flow control device 50 or of the guide vanes 57. In this open position, the guide vanes 57 are situated with their inner surface 63 at a cylinder diameter of the fresh-air supply channel 36, for example the first flow cross section A1. Between the oblique flanks, the guide vanes 57 form gaps laterally with respect to one another.

FIG. 4 additionally shows an insertable rear wall 67 and a seal bushing 68. These are however not of relevance for the described principle.

Depending on the pressure prevailing in the fresh-air volute 32, the control cylinder 51 may assume other positions between the two axial end positions as per FIGS. 2 and 4. In a manner dependent on this position, it is also possible for the guide vanes 57 to assume correspondingly different (intermediate) positions.

The described turbocharger 1 thus permits the advantages and functions mentioned in the introduction, wherein, in a manner dependent on a pressure prevailing in the fresh-air volute 32, the flow cross section for the fresh-air mass flow FM for the impingement of flow on the compressor wheel 13 is adapted in continuous, self-controlling fashion. An adaptation with regard to the compressor characteristic map may be realized by way of the shape, number and size of the guide vanes 57, a cross-sectional area of the piston ring 52 which is exposed to the pressure from the fresh-air volute 32, and the spring elements 56, 66, for example the spring rates thereof. Furthermore, the compressor characteristic map and a response characteristic of the self-control may be adjusted by means of the connection of the piston cavity 53 to the fresh-air volute 32, as will be described below.

Figure 5:
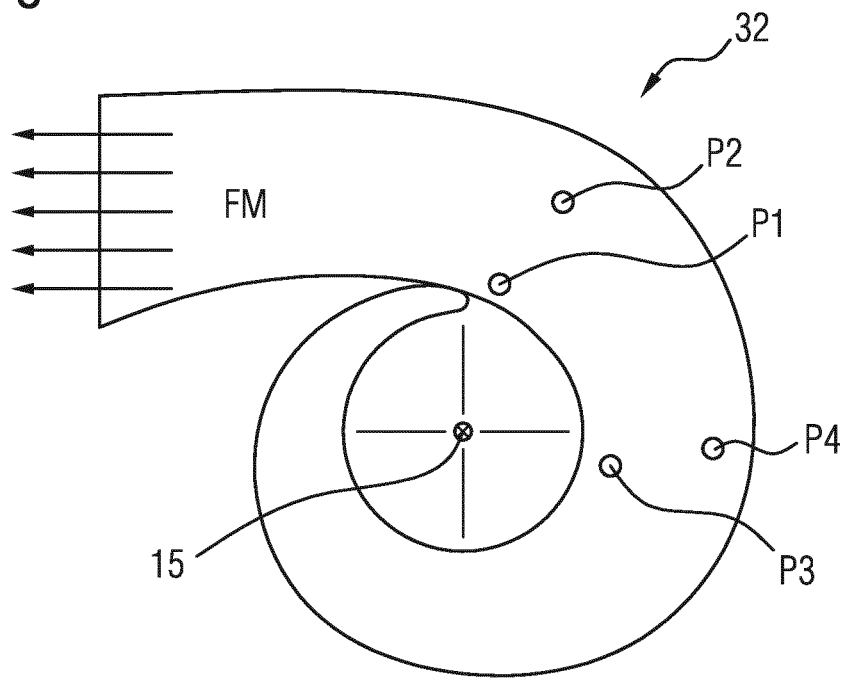
FIGS. 5 and 6 show schematic views of a ring-shaped channel of the compressor of the turbocharger.
Figure 6:
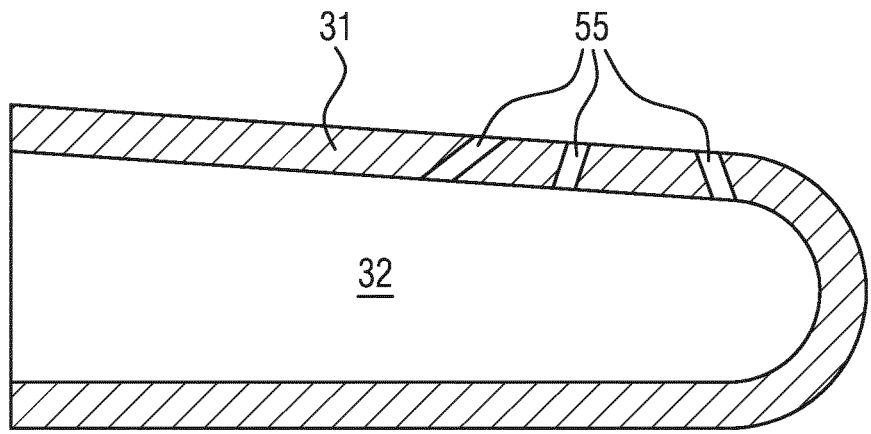

FIG. 5 schematically shows the fresh-air volute 32. Various positions P1 to P4 for the bore 55 are illustrated here. FIG. 6 furthermore shows that an orientation of the bore 55 may also vary. The advantages mentioned in the introduction can be achieved in this way.

The invention claimed is:

1. A turbocharger for a combustion machine, the turbocharger comprising:
   a rotor shaft;
   a bearing housing mounting said rotor shaft in a rotatable manner;
   a compressor having a compressor wheel disposed for conjoint rotation on said rotor shaft, said compressor further having a compressor channel being a fresh-air volute;
   a fresh air supply channel for conducting a fresh air mass flow to said compressor wheel, said fresh air supply channel having a first flow cross section upstream of said compressor wheel; and
   a flow control device being adjustable between an open position, in which said first flow cross section is opened up, and a closed position, in which said first flow cross section is reduced to a second flow cross section, said flow control device is fluidically coupled to said compressor channel of said compressor downstream of said compressor wheel, such that said flow control device is adjusted in a manner dependent on a pressure prevailing in said fresh-air volute;
   wherein said flow control device has a control cylinder which, for purposes of adjusting said flow control device, is mounted so as to be displaceable axially with respect to a rotor axis of rotation of said rotor shaft, and which is fluidically coupled to said compressor channel of said compressor downstream of said compressor wheel; and
   wherein said flow control device has multiple guide vanes which are mounted rotatably on said control cylinder, wherein said guide vanes are adjustable between an open position and a closed position by displacement of said control cylinder.

2. The turbocharger according to claim 1, wherein said control cylinder is displaceable between two axial end positions including a first axial end position which corresponds to the open position of said flow control device and a second axial end position which corresponds to the closed position of said flow control device.

3. The turbocharger according to claim 1, wherein:
a compressor housing has a piston cavity formed therein; and
said control cylinder has an encircling piston ring that is guided in an axially displaceable fashion in said piston cavity.

4. The turbocharger according to claim 3, further comprising at least one seal element configured for sealing off said piston ring with respect to said piston cavity.

5. The turbocharger according to claim 3, further comprising at least one channel, said piston cavity is connected by means of said at least one channel to said compressor channel of said compressor.

6. The turbocharger according to claim 3, wherein said flow control device has an axial spring element which is disposed so as to exert a spring force on said control cylinder in an axial direction with respect to the rotor axis of rotation counter to a pressure force exerted on said control cylinder by pressure prevailing in said compressor channel, such that said control cylinder is axially displaceable in a manner dependent on the spring force and the pressure force.

7. The turbocharger according to claim 1, wherein said guide vanes, in the open position, are disposed such that said guide vanes open up the first flow cross section, and wherein, with axial displacement of said control cylinder, said guide vanes are displaced toward said compressor wheel and interact with said compressor housing such that said guide vanes are rotated in order to reduce the first flow cross section.

8. The turbocharger according to claim 7, wherein said flow control device has a radial spring element which is disposed so as to impart a spring force to in each case a rear end of said guide vanes in a direction of the rotor axis of rotation, such that a front end of said guide vanes is pressed against said compressor housing.

9. The turbocharger according to claim 1, wherein, in the closed position, said guide vanes are displaced axially in a direction of said compressor wheel and are rotated such that said guide vanes form a substantially closed conical ring with the second flow cross section.

10. The turbocharger according to claim 1, wherein said guide vanes are shaped so as to have a tapering front end, which faces toward said compressor wheel.

11. The turbocharger according to claim 1, wherein:
said compressor housing has two parts including a first part fastened to said bearing housing and surrounds said compressor wheel, and a second part fastened to said first part; and
said flow control device is disposed between said first and second parts.

* * * * *